US012409569B2

(12) United States Patent
Choi et al.

(10) Patent No.: US 12,409,569 B2
(45) Date of Patent: Sep. 9, 2025

(54) ADAPTIVE ROBOT GRIPPER FOR PINCH GRIP

(71) Applicant: INDUSTRY-UNIVERSITY COOPERATION FOUNDATION HANYANG UNIVERSITY ERICA CAMPUS, Ansan-si (KR)

(72) Inventors: Youngjin Choi, Seongnam-si (KR); Dukchan Yoon, Ansan-si (KR)

(73) Assignee: INDUSTRY-UNIVERSITY COOPERATION FOUNDATION HANYANG UNIVERSITY ERICA CAMPUS, Ansan-si (KR)

(*) Notice: Subject to any disclaimer, the term of this patent is extended or adjusted under 35 U.S.C. 154(b) by 548 days.

(21) Appl. No.: 17/880,805

(22) Filed: Aug. 4, 2022

(65) Prior Publication Data

US 2022/0379496 A1 Dec. 1, 2022

Related U.S. Application Data

(63) Continuation of application No. PCT/KR2020/019027, filed on Dec. 23, 2020.

(30) Foreign Application Priority Data

Feb. 18, 2020 (KR) ........................ 10-2020-0019494

(51) Int. Cl.
*B25J 15/08* (2006.01)
*B25J 9/12* (2006.01)

(52) U.S. Cl.
CPC ............... *B25J 15/08* (2013.01); *B25J 9/126* (2013.01)

(58) Field of Classification Search
CPC ........ B25J 15/08; B25J 9/126; B25J 15/0028; B25J 15/0038
(Continued)

(56) References Cited

U.S. PATENT DOCUMENTS 4,600,357 A 7/1986 Coules
8,388,035 B2 * 3/2013 Kamon ................ B25J 15/0266 294/213
(Continued)

FOREIGN PATENT DOCUMENTS

JP 2016-068192 A 5/2016
KR 10-1608516 B1 4/2016
(Continued)

OTHER PUBLICATIONS

International Search Report for PCT/KR2020/019027 dated Jun. 3, 2021.

*Primary Examiner* — Paul T Chin
(74) *Attorney, Agent, or Firm* — Sughrue Mion, PLLC

(57) ABSTRACT

Provided is a robot gripper. The robot gripper comprises: at least two finger units which symmetrically face each other; finger tips which are provided at the terminal ends of the finger units and linked with the operation of the finger units; and a driving unit connected to the finger units so as to operate the finger units. When the finger units are operated, the finger tips pinch-grip an object by moving toward an inner area, which at least two of the finger units form by facing each other, while adapting to conflicts with constraints of the external environment. A force applied to the finger tips in order to enable the pinch grip can act in a direction that raises the object while being applied toward the inner area, or act in a direction lowering the object while being applied toward the inner area.

9 Claims, 15 Drawing Sheets

(58) Field of Classification Search
USPC .......................................................... 294/106
See application file for complete search history.

(56) References Cited

U.S. PATENT DOCUMENTS

| | | | | |
|---|---|---|---|---|
| 8,757,690 | B2 * | 6/2014 | Gao | B25J 15/0213 294/198 |
| 9,770,829 | B2 * | 9/2017 | Zhao | B25J 15/0066 |
| 9,782,902 | B1 * | 10/2017 | Kim | B25J 15/022 |
| 10,279,484 | B2 * | 5/2019 | Birglen | B25J 15/12 |
| 11,345,049 | B2 * | 5/2022 | An | A61F 2/586 |
| 11,518,045 | B1 * | 12/2022 | Alqasemi | B25J 15/0038 |
| 11,850,734 | B2 * | 12/2023 | Liu | B25J 15/0206 |
| 12,151,375 | B2 * | 11/2024 | Kim | B25J 15/026 |
| 2014/0180477 | A1 * | 6/2014 | Chung | B25J 15/0213 294/198 |
| 2014/0265401 | A1 * | 9/2014 | Allen Demers | B25J 15/0266 294/201 |

FOREIGN PATENT DOCUMENTS

| | | | |
|---|---|---|---|
| KR | 10-1731326 | B1 | 4/2017 |
| KR | 10-1862023 | B1 | 5/2018 |
| KR | 10-1962568 | B1 | 3/2019 |
| KR | 10-1989949 | B1 | 6/2019 |

* cited by examiner

【FIG 1】
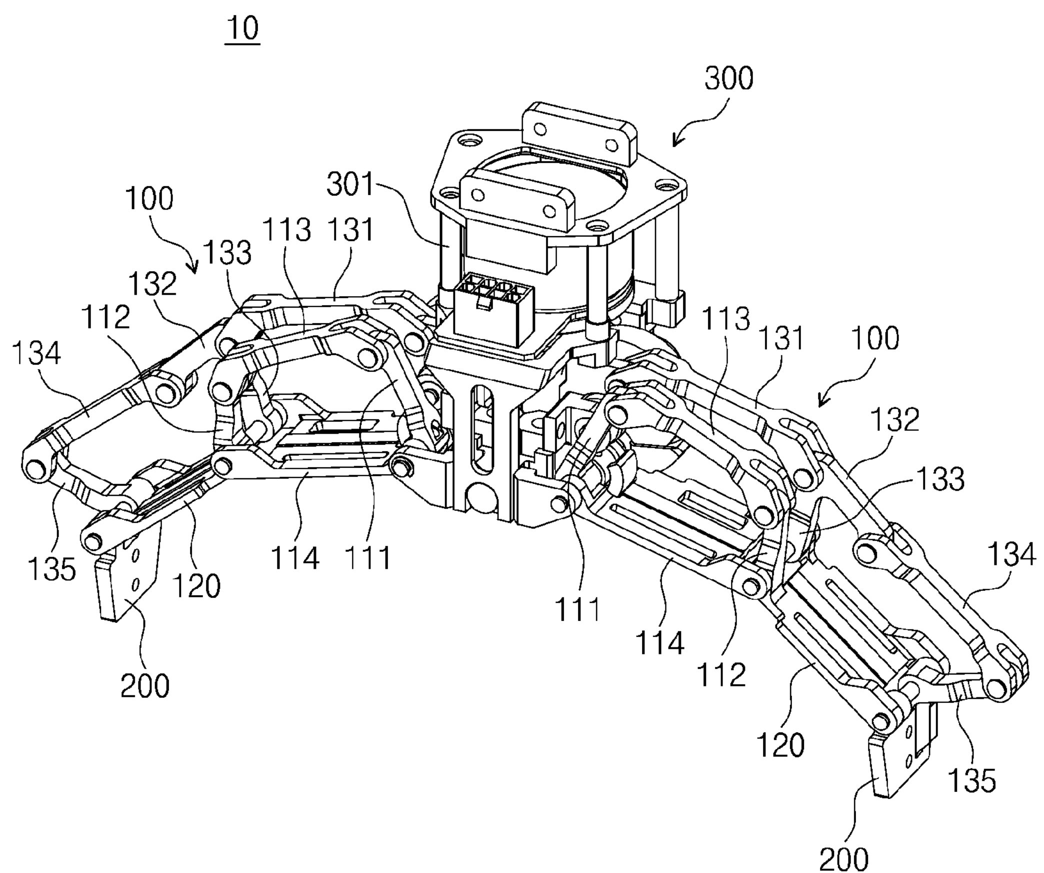

【FIG 2】
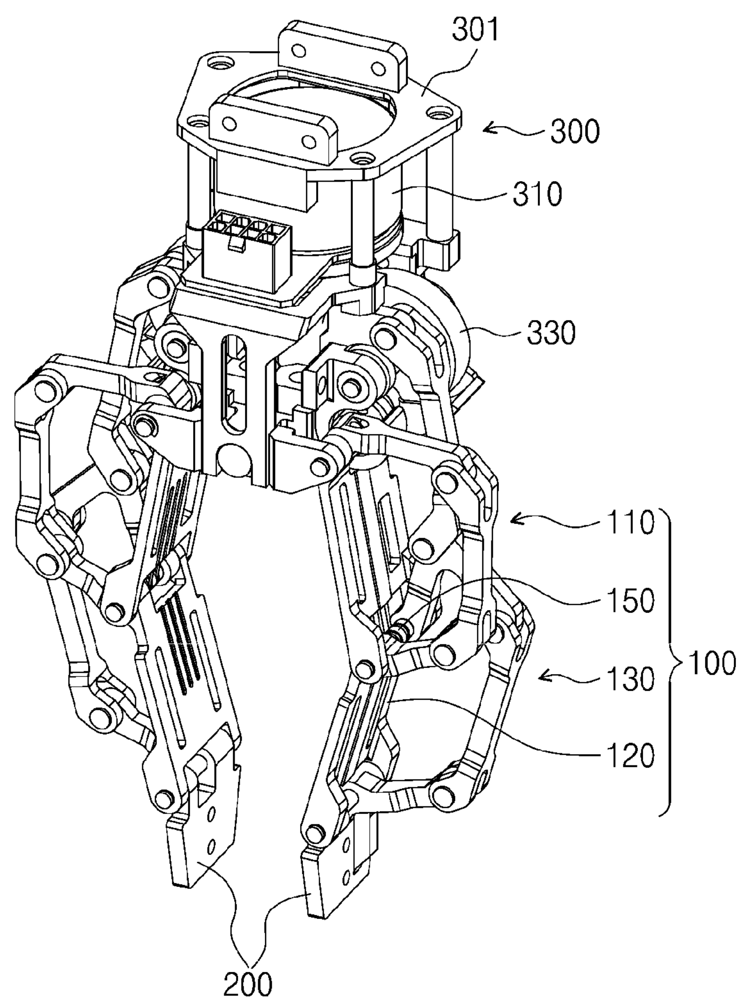

【FIG 3】
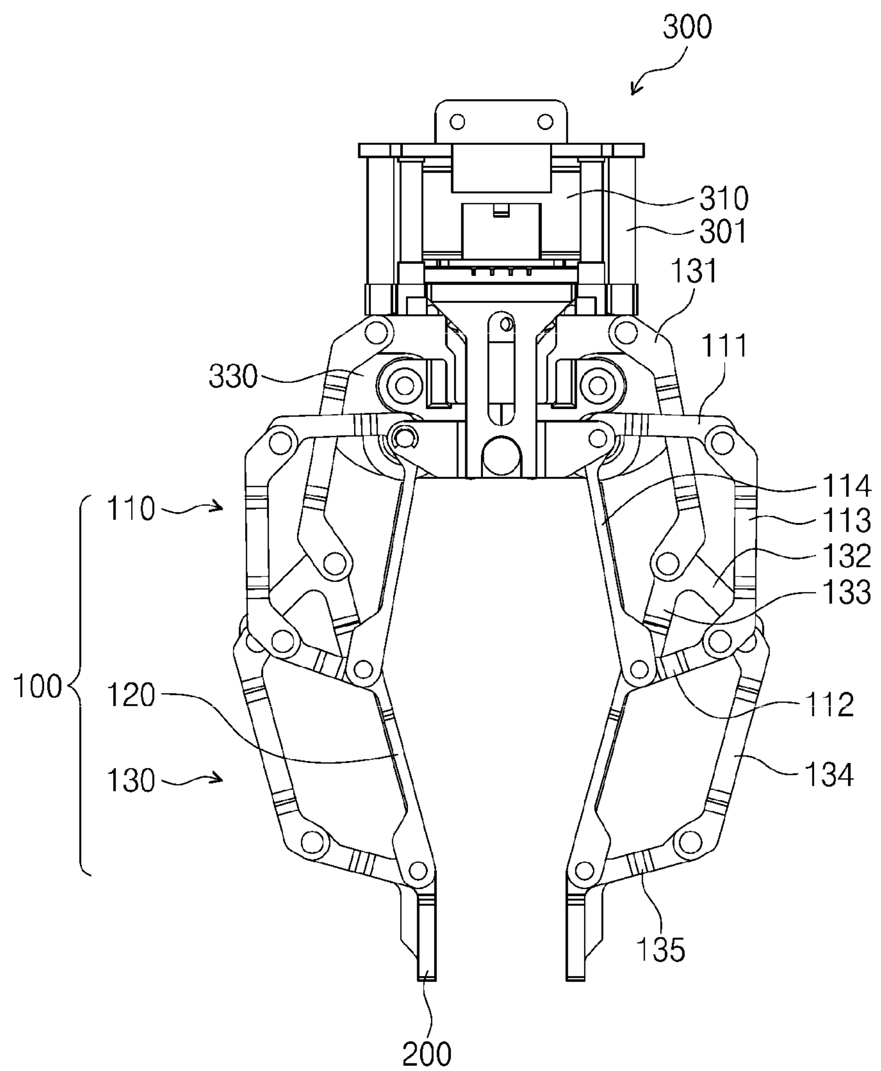

【FIG 4】
10
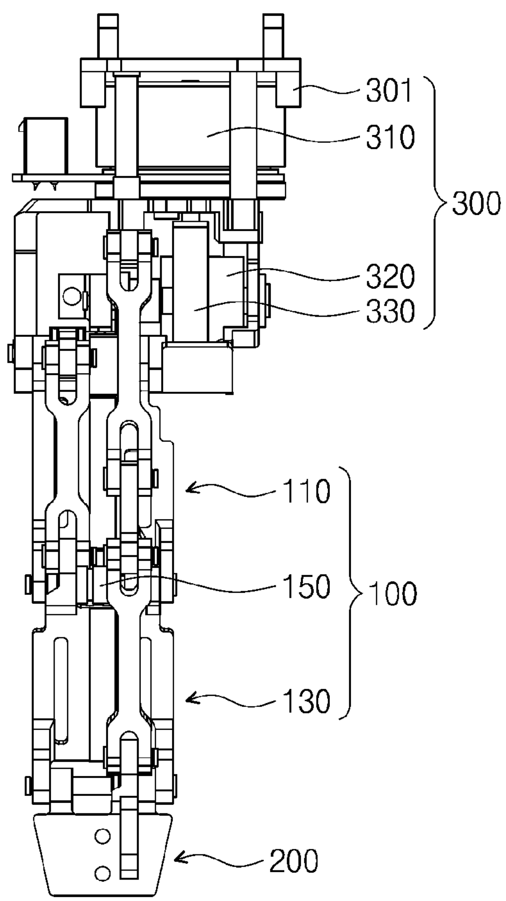

【FIG 5】
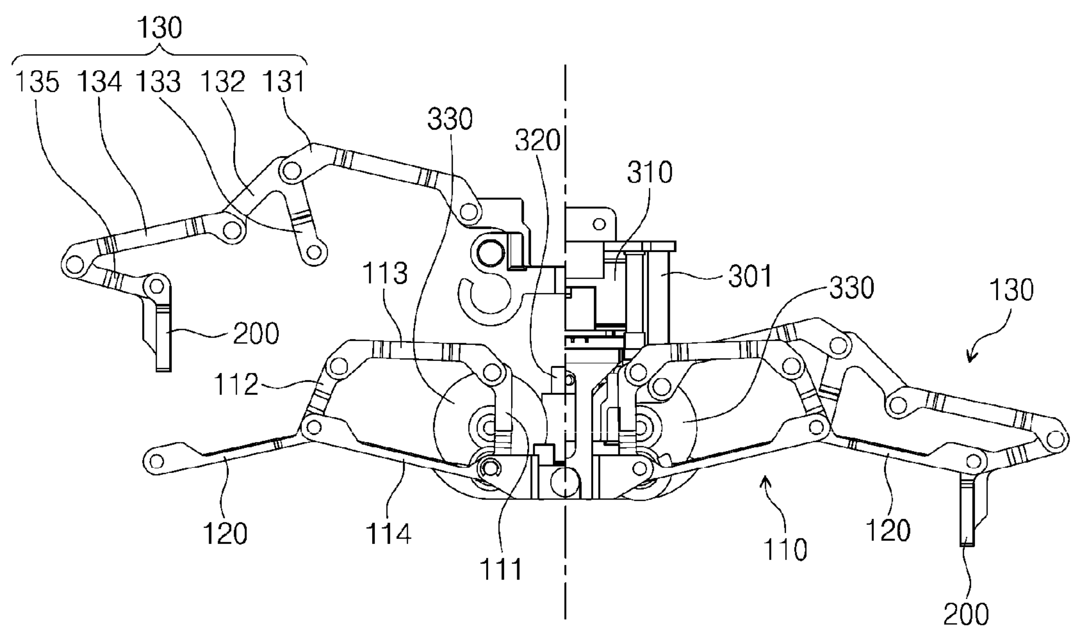

【FIG 6】
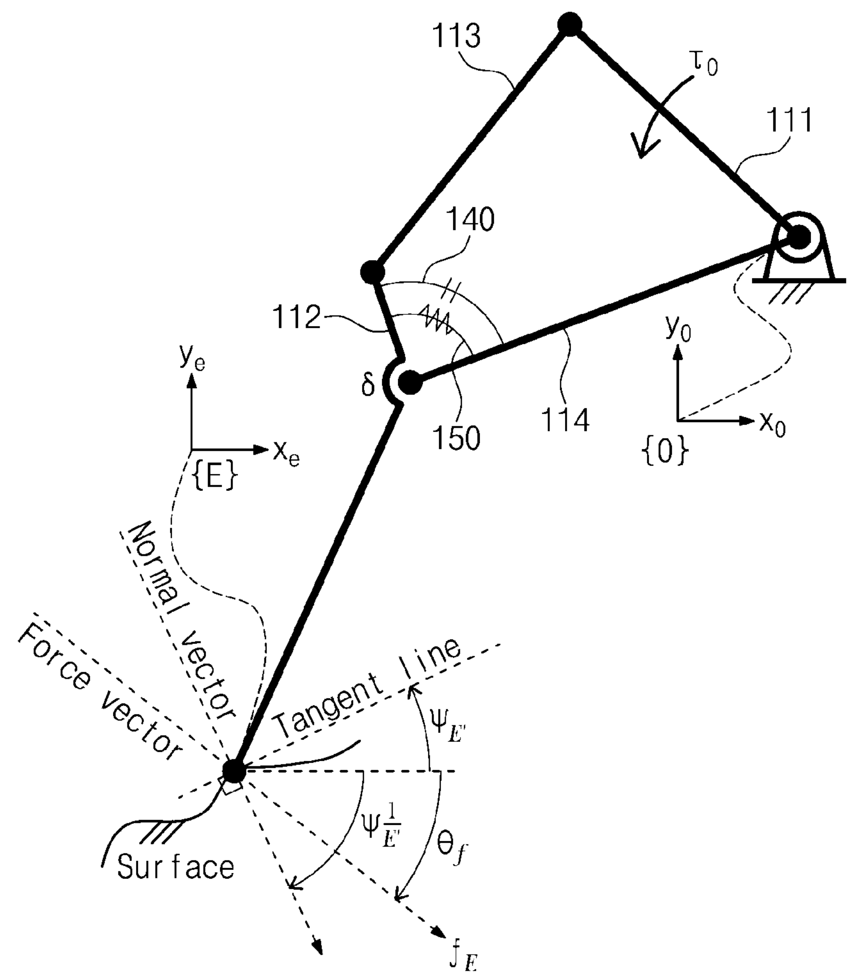

【FIG 7】
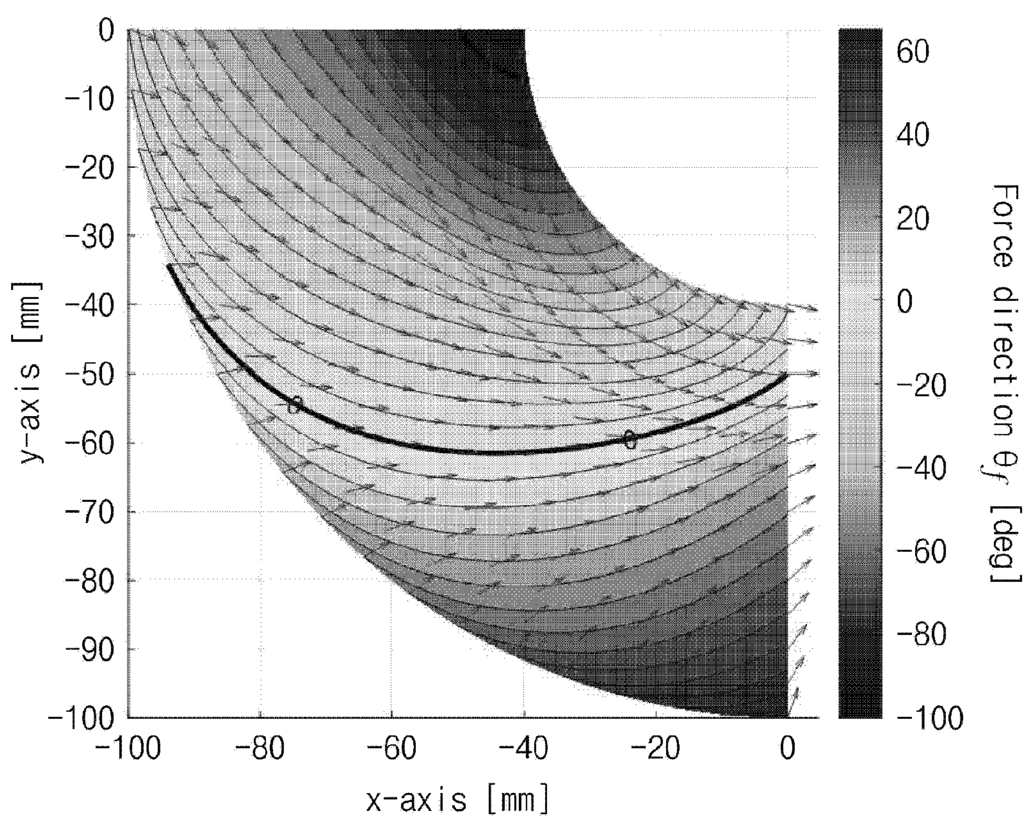

【FIG 8】
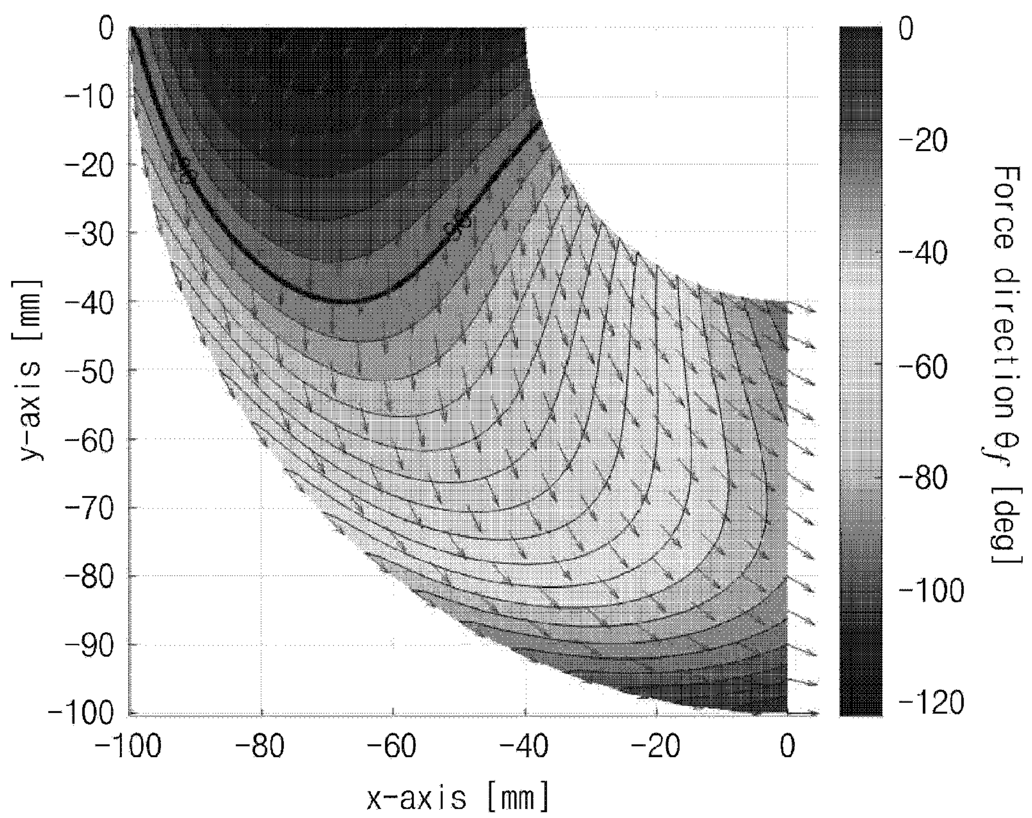

【FIG 9】
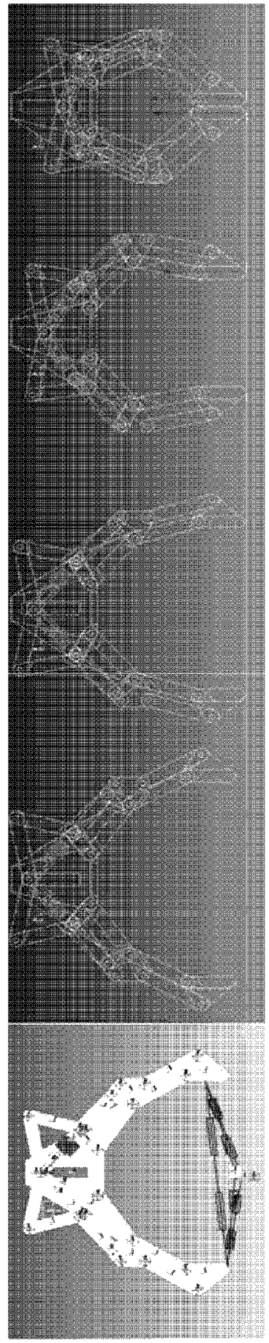

【FIG 10】
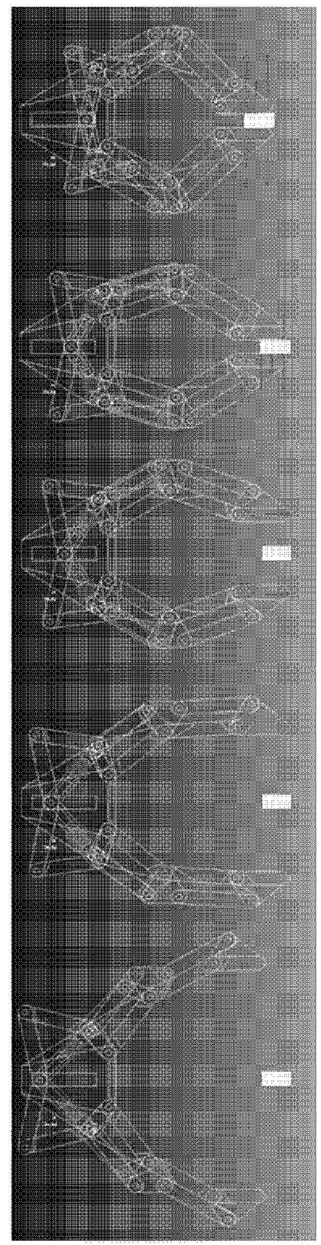

【FIG 11】
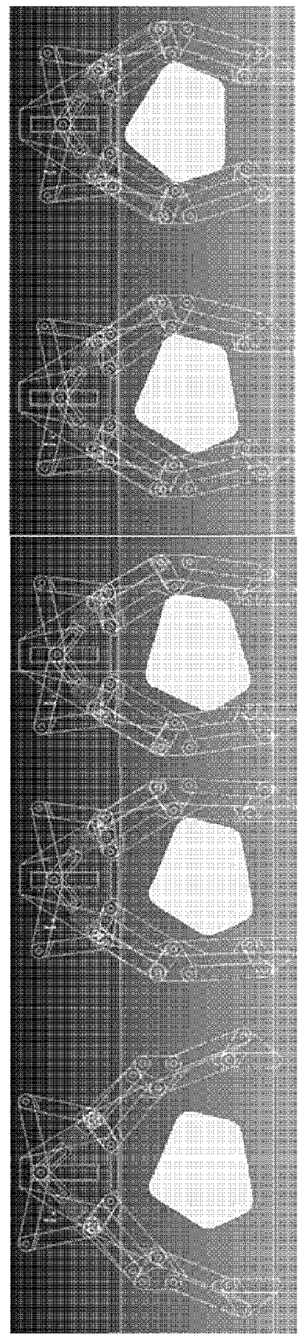

【FIG 12】
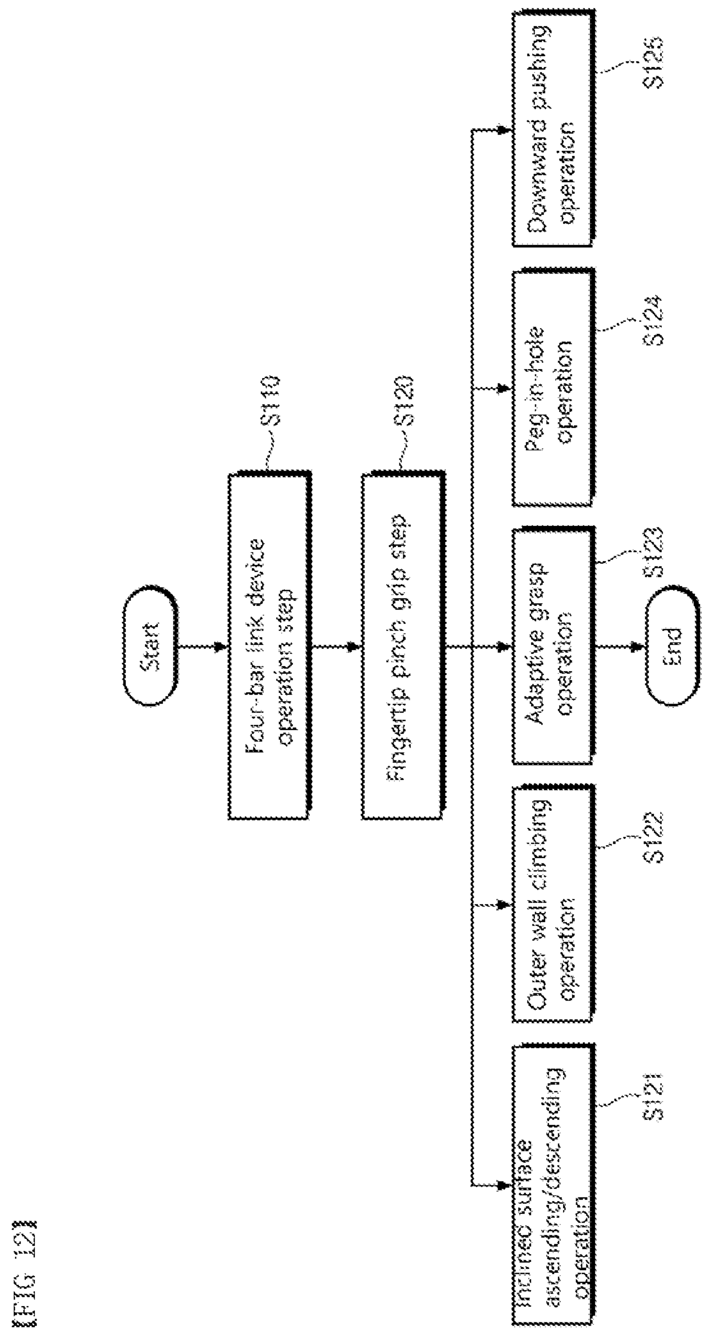

【FIG 13】
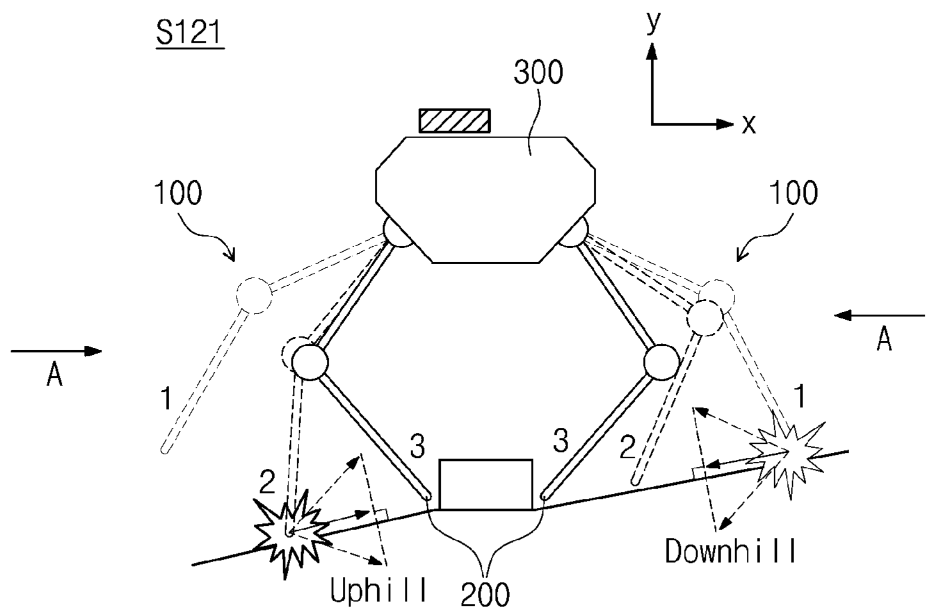
【FIG 14】
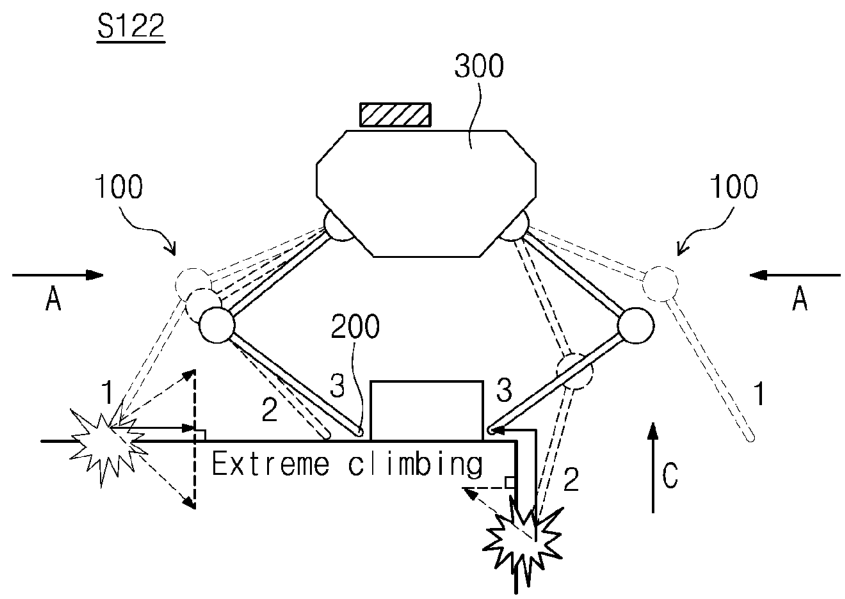

【FIG 15】
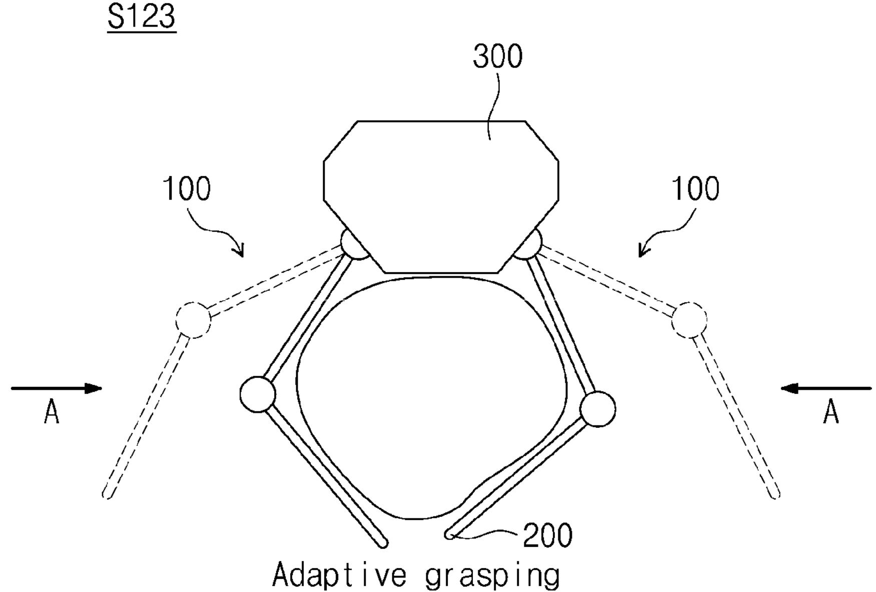
【FIG 16】
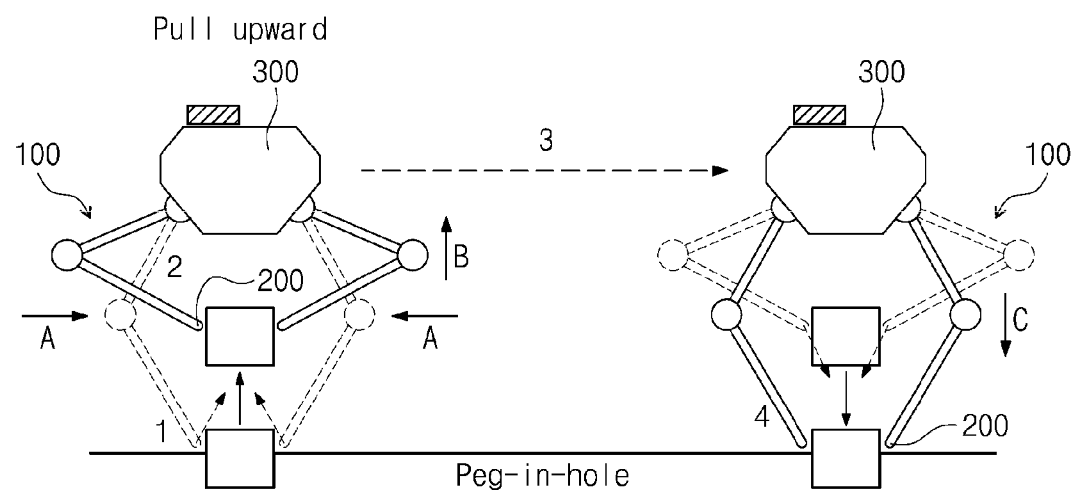

【FIG 17】
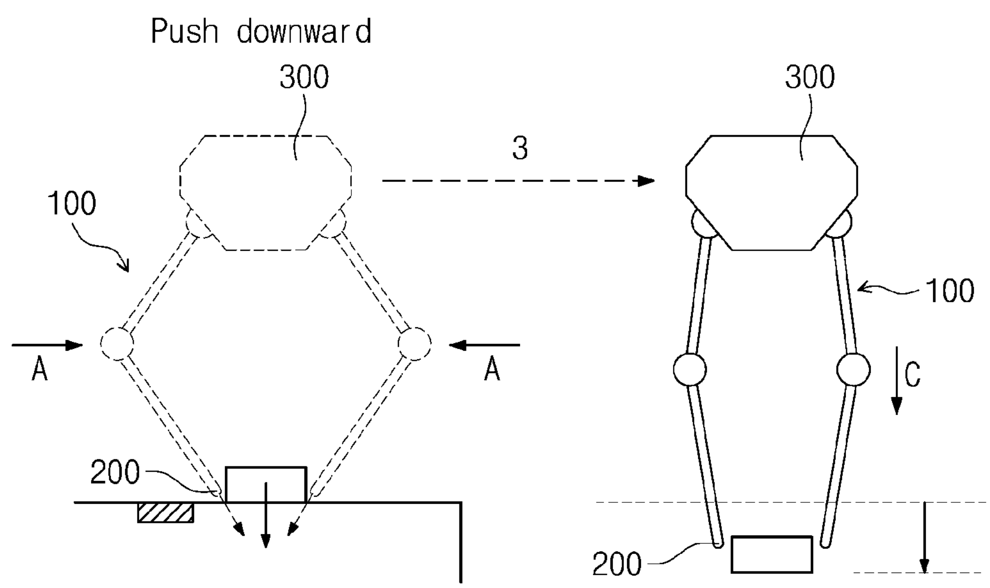

ADAPTIVE ROBOT GRIPPER FOR PINCH GRIP

TECHNICAL FIELD

The present invention relates to a robot gripper, and more particularly, to a robot gripper capable of adapting to environmental constraints.

BACKGROUND ART

The most representative gripper is a gripper developed by C. M. Gosselin, and various grippers developed so far follow advantages of the gripper developed by C. M. Gosselin.

The gripper developed by C. M. Gosselin implements pinch grip and object-adaptive grasp by using one driver per finger module. In detail, the gripper may grasp an object as a finger adapts to a shape of an object when the gripper grasps a relatively large object, and may pinch an object as a fingertip maintains a perpendicular angle by a parallelogram mechanism when the gripper pinches a relatively small object.

In this case, since most objects are placed on a table, there are environmental constraints, and when a small object is pinched, a collision and contact between a table surface and a fingertip may frequently occur.

However, according to the related art, considerations on the environmental constraints that actually occur have been rarely made in a process of developing a gripper.

DISCLOSURE

Technical Problem

One technical object of the present invention is to provide a robot gripper capable of adapting to environmental constraints.

Another technical object of the present invention is to provide a robot gripper having strong pinch grip ability.

Still another technical object of the present invention is to provide an underactuated robot gripper operated by one driver.

Yet another technical object of the present invention is to provide a robot gripper capable of performing object-adaptive grasp.

Technical objects of the present invention are not limited to the above-described technical objects.

Technical Solution

To achieve the technical objects described above, the present invention provides a robot gripper.

According to one embodiment, the robot gripper includes: at least two finger units symmetrically facing each other; a fingertip provided at a terminal end of the finger unit, and interworking with an operation of the finger unit; and a driving unit connected to the finger unit to operate the finger unit, wherein, when the finger unit is operated, the fingertip pinch-grips an object by moving toward an inner area, which is formed as the at least two finger units face each other, while adapting to a conflict with a constraint of an external environment, and a force applied to the fingertip to enable the pinch grip acts in a direction of raising the object upward while acting toward the inner area, or acts in a direction of lowering the object downward while acting toward the inner area.

According to one embodiment, the finger unit may include a four-bar link device, and a vector direction of the force applied to the fingertip may be determined according to a length relation of links that constitute sides of the four-bar link device, respectively.

According to one embodiment, the finger unit may further include a connection link, the connection link may connect the four-bar link device to the fingertip, and the four-bar link device may include: an input link having one longitudinal end connected to the driving unit; an output link facing the input link, and having one longitudinal end connected to one longitudinal end of the connection link; an intermediate link connected between an opposite longitudinal end of the input link and an opposite longitudinal end of the output link; and a frame link connected between the one longitudinal end of the output link and the one longitudinal end of the input link.

According to one embodiment, a length relation of the input link, the intermediate link, and the output link may be defined according to vector directions of forces generated when an opposite longitudinal end of the connection link makes contact with any three points on a horizontal plane, and, based on the defined length relation, a force acting in the direction of raising the object upward while acting toward the inner area may be applied to the fingertip, or a force acting in the direction of lowering the object downward while acting toward the inner area may be applied to the fingertip.

According to one embodiment, while the output link has a relatively shorter length than the input link and the intermediate link, when the input link has a relatively shorter length than the intermediate link, the force applied to the fingertip may act in the direction of raising the object upward while acting toward the inner area.

According to one embodiment, while the output link has a relatively shorter length than the input link and the intermediate link, when the input link has a relatively longer length than the intermediate link, the force applied to the fingertip may act in the direction of lowering the object downward while acting toward the inner area.

According to one embodiment, an angle formed between the connection link and the output link, which is set when the force applied to the fingertip acts in the direction of raising the object upward while acting toward the inner area, may be relatively greater than an angle formed between the connection link and the output link, which is set when the force applied to the fingertip acts in the direction of lowering the object downward while acting toward the inner area.

According to one embodiment, the finger unit may further include a parallelogrammic link device, and the parallelogrammic link device may be coupled to the four-bar link device and the connection link to maintain an installation angle of the fingertip, and may be dependent on an operation of the four-bar link device.

According to one embodiment, the finger unit may further include a stopper, and the stopper may be formed between the output link and the frame link, and configured to restrain a rotation of the output link in a direction of increasing an angle formed between the output link and the frame link.

According to one embodiment, the finger unit may further include an elastic member, and the elastic member may be formed between the output link and the frame link, elastically deformed in a case where an inclination of the output link is changed to increase an angle formed between the output link and the frame link when the driving unit is driven, and configured to recover the inclination of the output link into an initial state through an elastic restoring force so that the angle formed between the output link and the frame link forms an initially set angle again when the driving unit is not driven.

According to one embodiment, the at least two finger units may be underactuated by the driving unit.

According to one embodiment, the driving unit may include: one motor; one worm gear rotated by the one motor; and worm wheels provided in a number corresponding to the at least two finger units so as to be connected to the at least two finger units, respectively, and engaged with the one worm gear so as to be rotated.

Advantageous Effects

According to an embodiment of the present invention, the robot gripper includes: at least two finger units symmetrically facing each other; a fingertip provided at a terminal end of the finger unit, and interworking with an operation of the finger unit; and a driving unit connected to the finger unit to operate the finger unit, wherein, when the finger unit is operated, the fingertip pinch-grips an object by moving toward an inner area, which is formed as the at least two finger units face each other, while adapting to a conflict with a constraint of an external environment, and a force applied to the fingertip to enable the pinch grip acts in a direction of raising the object upward while acting toward the inner area, or acts in a direction of lowering the object downward while acting toward the inner area.

Accordingly, a robot gripper capable of adapting to environmental constraints, which is a robot gripper configured such that a fingertip flexibly slides on a table surface to pinch-grip an object even when the fingertip collides with table surfaces having various inclinations and on which the object is placed, can be provided.

In addition, according to an embodiment of the present invention, a robot gripper having strong pinch grip ability can be provided.

In addition, according to an embodiment of the present invention, an underactuated robot gripper in which at least two finger units are operated by a driving unit including one motor can be provided.

In addition, according to an embodiment of the present invention, an elastic member may be provided between an output link and a frame link, so that a robot gripper capable of adaptive-grasping an object through elasticity and an elastic restoring force of the elastic member when a relatively large object is grasped can be provided.

DESCRIPTION OF DRAWINGS

FIG. 1 is a first perspective view showing a robot gripper according to one embodiment of the present invention.

FIG. 2 is a second perspective view showing the robot gripper according to one embodiment of the present invention.

FIG. 3 is a front view of FIG. 2.

FIG. 4 is a side view of FIG. 2.

FIG. 5 is a comparative view showing comparison of disassembled and assembled shapes of the robot gripper according to one embodiment of the present invention.

FIG. 6 is a reference view for describing a pinch grip operation of the robot gripper according to one embodiment of the present invention.

FIGS. 7 and 8 show simulation results for a vector direction of a force applied to a fingertip, which is determined according to a length of each of links that constitute a four-bar link device, in the robot gripper according to one embodiment of the present invention.

FIGS. 9 to 11 are dynamic simulation images of the robot gripper according to one embodiment of the present invention.

FIG. 12 is a flowchart showing a method of operating a robot gripper according to one embodiment of the present invention.

FIG. 13 is a reference view showing a step S121 of FIG. 12.

FIG. 14 is a reference view showing a step S122 of FIG. 12.

FIG. 15 is a reference view showing a step S123 of FIG. 12.

FIG. 16 is a reference view showing a step S124 of FIG. 12.

FIG. 17 is a reference view showing a step S125 of FIG. 12.

MODE FOR INVENTION

Hereinafter, exemplary embodiments of the present invention will be described in detail with reference to the accompanying drawings. However, the technical idea of the present invention is not limited to the embodiments described herein, but may be realized in different forms. The embodiments introduced herein are provided to sufficiently deliver the idea of the present invention to those skilled in the art so that the disclosed contents may become thorough and complete.

When it is mentioned in the present disclosure that one element is on another element, it means that one element may be directly formed on another element, or a third element may be interposed between one element and another element. Further, in the drawings, thicknesses of films and areas are exaggerated for efficient description of the technical contents.

In addition, in the various embodiments of the present disclosure, the terms such as first, second, and third are used to describe various elements, but the elements are not limited to the terms. The terms are used only to distinguish one element from another element. Therefore, an element mentioned as a first element in one embodiment may be mentioned as a second element in another embodiment. The embodiments described and illustrated herein include their complementary embodiments. Further, the term "and/or" used herein is used to include at least one of the elements enumerated before and after the term.

As used herein, the terms of a singular form may include plural forms unless the context clearly indicates otherwise. Further, the terms such as "including" and "having" are used to designate the presence of features, numbers, steps, elements, or combinations thereof described in the present disclosure, and shall not be construed to preclude any possibility of the presence or addition of one or more other features, numbers, steps, elements, or combinations thereof.

Further, in the following description of the present invention, detailed descriptions of known functions and configurations incorporated herein will be omitted when they may make the subject matter of the present invention unnecessarily unclear.

FIGS. 1 to 11 are views for describing a robot gripper according to one embodiment of the present invention.

As shown in FIGS. 1 to 5, according to one embodiment of the present invention, a robot gripper 10 may include a finger unit 100, a fingertip 200, and a driving unit 300.

The finger unit 100 may be provided upward from an edge of a top surface of a housing 301 of the driving unit 300 by using the top surface of the housing 301 of the driving unit 300 as a palm surface. At least two finger units 100 may be provided to grasp an object. According to one embodiment of the present invention, the at least two finger units 100 may be underactuated by the driving unit 300, which will be described in more detail below. In addition, for convenience of description, it will be assumed in the following description that a pair of finger units 100 are provided.

The pair of finger units 100 may symmetrically face each other. The fingertip 200 serving as a tip of a finger may be provided at a terminal end of each of the pair of finger units 100.

According to one embodiment of the present invention, the finger unit 100 may implement pinch grip of the fingertip 200 with respect to the object, and may have a four-bar link device 110 to grasp the object. In addition, the finger unit 100 may include a connection link 120.

The four-bar link device 110 may include an input link 111, an output link 112, an intermediate link 113, and a frame link 114.

The input link 111 may be connected to the driving unit 300 to rotate by a rotation torque transmitted from the driving unit 300. The input link 111 may have a bar shape. In this case, one longitudinal end of the input link 111 may be connected to the driving unit 300, and an opposite longitudinal end of the input link 111 may be connected to the intermediate link 113.

The output link 112 may face the input link 111. The output link 112 may have a bar shape. The output link 112 may be connected to the connection link 120, the intermediate link 113, and the frame link 114. In detail, one longitudinal end of the output link 112 may be connected to the connection link 120 and the frame link 114, and an opposite longitudinal end of the output link 112 may be connected to the intermediate link 113.

The intermediate link 113 may have a bar shape. The intermediate link 113 may be connected between the input link 111 and the output link 112. In detail, one intermediate end of the intermediate link 113 may be joint-coupled to the opposite longitudinal end of the input link 111. In addition, an opposite longitudinal end of the intermediate link 113 may be joint-coupled to the opposite longitudinal end of the output link 112.

The frame link 114 may have a bar shape. The frame link 114 may be coupled between the output link 112 and the input link 111. In detail, one longitudinal end of the frame link 114 may be joint-coupled to the one longitudinal end of the output link 112. In addition, an opposite longitudinal end of the frame link 114 may be joint-coupled to the one longitudinal end of the input link 111. According to an embodiment of the present invention, the frame link 114 may be defined as a first bar of the finger unit 100.

According to one embodiment of the present invention, a vector direction of a force applied to the fingertip 200 that implements various pinch grip operations may be determined according to a length relation of links that constitute sides of the four-bar link device 110, respectively, that is, according to a length relation of the input link 111, the output link 112, the intermediate link 113, and the frame link 114, which will be described in more detail below.

Meanwhile, the connection link 120 may connect the four-bar link device 110 to the fingertip 200. The connection link 120 may have a bar shape. One longitudinal end of the connection link 120 may be connected to the one longitudinal end of the output link 112. In addition, an opposite longitudinal end of the connection link 120 may be connected to the fingertip 200. According to one embodiment of the present invention, the connection link 120 may be defined as a second bar of the finger unit 100.

According to one embodiment of the present invention, the finger unit 100 may further include a parallelogrammic link device 130. The parallelogrammic link device 130 may be coupled to the four-bar link device 110 and the connection link 120. Accordingly, the parallelogrammic link device 130 may maintain an installation angle of the fingertip 200. In this case, the parallelogrammic link device 130 may not operate independently. The parallelogrammic link device 130 may be dependent on an operation of the four-bar link device 110 connected to the driving unit 300.

Referring to FIG. 5, the parallelogrammic link device 130 may include a first link 131, a second link 132, a third link 133, a fourth link 134, and a fifth link 135.

The first link 131 may have a bar shape. One longitudinal end of the first link 131 may be connected to the housing 301 of the driving unit 300. In addition, an opposite longitudinal end of the first link 131 may be connected to the second link 132.

The second link 132 may have a bar shape. One longitudinal end of the second link 132 may be joint-coupled to the opposite longitudinal end of the first link 131. In addition, an opposite longitudinal end of the second link 132 may be connected to the fourth link 134.

The third link 133 may have a bar shape. One longitudinal end of the third link 133 may be connected to a shaft at which the longitudinal ends of the connection link 120 and the output link 112 are connected and joint-coupled to each other. In addition, an opposite longitudinal end of the third link 133 may be connected to a shaft at which the first link 131 and the second link 132 are joint-coupled to each other. In this case, the third link 133 may form a V-shape with the second link 132 to increase a radius of rotation. In this case, the third link 133 may be formed integrally with the second link 132.

The fourth link 134 may have a bar shape. One longitudinal end of the fourth link 134 may be joint-coupled to the opposite longitudinal end of the second link 132. In addition, an opposite longitudinal end of the fourth link 134 may be connected to the fifth link 135.

The fifth link 135 may have a bar shape. One longitudinal end of the fifth link 135 may be joint-coupled to the opposite longitudinal end of the fourth link 134. In addition, an opposite longitudinal end of the fifth link 135 may be connected to the fingertip 200.

Meanwhile, as shown in FIG. 6, according to one embodiment of the present invention, the finger unit 100 may further include a stopper 140. The stopper 140 may be provided between the output link 112 and the frame link 114. The stopper 140 may restrain a rotation of the output link 112 in a direction of increasing an angle formed between the output link 112 and the frame link 114.

In addition, referring to FIG. 6, according to one embodiment of the present invention, the finger unit 100 may further include an elastic member 150. The elastic member 150 may be provided between the output link 112 and the frame link 114. The elastic member 150 may be elastically deformed in a case where an inclination of the output link 112 is changed to increase the angle formed between the output link 112 and the frame link 114 when the driving unit 300 is driven. Accordingly, adaptive grasp of the robot gripper 10 may be enabled. In addition, the elastic member 150 may recover the inclination of the output link 112 into an initial state through an elastic restoring force so that the angle formed between the output link 112 and the frame link 114 may form an initially set angle again when the driving unit 300 is not driven.

The elastic member 150 may be configured as a spring, preferably as a torsion spring.

When the elastic member 150 is configured as a torsion spring, a torsion torque may be generated when the inclination of the output link 112 is changed, and the torsion torque may act as a restoring force for recovering the inclination of the output link 112 into the initial state.

Referring again to FIGS. 1 to 5, the fingertip 200 may be provided at the terminal end of the finger unit 100 to interwork with an operation of the finger unit 100. In detail, one longitudinal end of the fingertip 200 may be connected to the opposite longitudinal end of the fifth link 135 of the parallelogrammic link device 130. In this case, the one longitudinal end of the fingertip 200 and the opposite longitudinal end of the fifth link 135 may be connected to the opposite longitudinal end of the connection link 120. The fingertip 200 may have a contact surface capable of pinch-gripping the object, and the fingertips 200 provided at the terminal ends of the finger units 100 facing each other may have contact surfaces facing each other. In this case, the contact surface of the fingertip 200 may be set to form a perpendicular surface that is perpendicular to the top surface of the housing 301 of the driving unit 300, and a set state may be maintained to be fixed by the parallelogrammic link device 130.

According to one embodiment of the present invention, when the finger unit 100 is operated, the fingertip 200 may pinch-grip the object by moving toward an inner area, which is formed as the pair of finger units 100 face each other, while adapting to a conflict with a constraint of an external environment.

In this case, a force applied to the fingertip 200 to enable the pinch grip with respect to the object may act in a direction of raising the object upward while acting toward the inner area formed as the pair of finger units 100 face each other. In addition, the force applied to the fingertip 200 to enable the pinch grip with respect to the object may act in a direction of lowering the object downward while acting toward the inner area formed as the pair of finger units 100 face each other.

In this case, as described above, the vector direction of the force applied to the fingertip 200 may be determined according to the length relation of the links that constitute the sides of the four-bar link device 110, respectively, that is, according to the length relation of the input link 111, the output link 112, the intermediate link 113, and the frame link 114.

Referring to FIG. 6, as an input torque $\tau_0$ is transmitted from the driving unit 300 to the input link 111, the input link 111 may rotate about a position {O}. In this case, the fingertip 200 making contact with an arbitrary surface may exert an output force $f_E$ onto the arbitrary surface, and a vector direction $\theta_f$ of the force applied to the fingertip 200 may be determined according to the length relation of the links 111, 112, 113, and 114. When passing through a tangent angle $\psi_E$ at a contact point of the surface, a sliding direction of the fingertip 200 may be found by using a normal angle $$\psi_{\frac{1}{E}}$$

that is perpendicular to the surface. For example, when assuming that the fingertip 200 makes contact with a surface having a tangent angle within _, a normal angle of the surface may be _. Such surface angles may be frequently observed in our daily life, and may be the most common angles. When _ on the surface, the fingertip 200 may not move anywhere. When _, the fingertip 200 may slide in a direction toward an inner portion that is formed as the finger units 100 face each other. When _, the fingertip 200 may slide in a direction toward an outer portion.

As described above, according to one embodiment of the present invention, the vector direction of the force applied to the fingertip 200 may be determined according to the length relation of the links that constitute the sides of the four-bar link device 110, respectively. In this case, the length relation of the input link 111, the intermediate link 113, and the output link 112, which are the links that constitute the sides of the four-bar link device 110, respectively, may be calculated as follows. In this case, a length of the frame link 114 may be automatically set when lengths of the input link 111, the intermediate link 113, and the output link 112 are calculated.

The length relation of the input link 111, the intermediate link 113, and the output link 112 may be defined according to vector directions of forces generated when the opposite longitudinal end of the connection link 120 makes contact with any three points on a horizontal plane. The opposite longitudinal end of the connection link 120 may substantially refer to the fingertip 200.

For example, when a vector direction of the force acting on the opposite longitudinal end of the connection link 120 is −20° in a case where the opposite longitudinal end of the connection link 120 makes contact with an −100 mm point on the horizontal plane, a vector direction of the force acting on the opposite longitudinal end of the connection link 120 is −55° in a case where the opposite longitudinal end of the connection link 120 makes contact with a −75 mm point on the horizontal plane, a vector direction of the force acting on the opposite longitudinal end of the connection link 120 is −90° in a case where the opposite longitudinal end of the connection link 120 makes contact with a −50 mm point on the horizontal plane, and an angle formed between the output link 112 and the connection link 120 is set to 125.5°, the length of the input link 111 may be calculated as 27.77 mm, the length of the intermediate link may be calculated as 48.02 mm, and the length of the output link may be calculated as 20.72 mm.

In addition, when a vector direction of the force acting on the opposite longitudinal end of the connection link 120 is −90° in a case where the opposite longitudinal end of the connection link 120 makes contact with a −100 mm point on the horizontal plane, a vector direction of the force acting on the opposite longitudinal end of the connection link 120 is −110° in a case where the opposite longitudinal end of the connection link 120 makes contact with a −90 mm point on the horizontal plane, a vector direction of the force acting on the opposite longitudinal end of the connection link 120 is −120° in case where the opposite longitudinal end of the connection link 120 makes contact with a −80 mm point on the horizontal plane, and an angle formed between the output link 112 and the connection link 120 is set to 69°, the length of the input link 111 may be calculated as 27.77 mm, the length of the intermediate link may be calculated as 48.02 mm, and the length of the output link may be calculated as 20.72 mm.

As described above, based on the defined length relation of the links, a force acting in the direction of raising the object upward while acting toward the inner area, which is formed as the pair of finger units 100 face each other, may be applied to the fingertip 200, or a force acting in the direction of lowering the object downward while acting toward the inner area, which is formed as the pair of finger units 100 face each other, may be applied to the fingertip 200.

In other words, referring to a simulation result of FIG. 7, while the output link 112 has a relatively shorter length than the input link 111 and the intermediate link 113, when the input link 111 has a relatively shorter length than the intermediate link 113, the force applied to the fingertip 200 may act in the direction of raising the object upward while acting toward the inner area, which is formed as the pair of finger units 100 face each other.

In addition, referring to a simulation result of FIG. 8, while the output link 112 has a relatively shorter length than the input link 111 and the intermediate link 113, when the input link 111 has a relatively longer length than the intermediate link 113, the force applied to the fingertip 200 may act in the direction of lowering the object downward while acting toward the inner area, which is formed as the pair of finger units 100 face each other.

In this case, an angle formed between the connection link 120 and the output link 112, which is set when the force applied to the fingertip 200 acts in the direction of raising the object upward while acting toward the inner area that is formed as the pair of finger units 100 face each other, may be relatively greater than an angle formed between the connection link 120 and the output link 112, which is set when the force applied to the fingertip 200 acts in the direction of lowering the object downward while acting toward the inner area that is formed as the pair of finger units 100 face each other.

FIGS. 9 to 11 are dynamic simulation images of the robot gripper according to one embodiment of the present invention. First, referring to FIG. 9, it may be found that the fingertip 200 slidably moves inward of the robot gripper 10 even when making contact with the plane. In addition, referring to FIG. 10, it may be found that the fingertip 200 slidably moves inward of the robot gripper 10 and raises a small object while pinching the small object when making contact with the plane. Further, referring to FIG. 11, it may be found that the robot gripper 10 adaptively grasps an indeterminate-shape object.

Referring again to FIGS. 1 to 5, the driving unit 300 may be connected to the pair of finger units 100. According to one embodiment of the present invention, two finger units 100 may be driven by one driving unit 300. In other words, the two finger units 100 may be underactuated by the one driving unit 300. In addition, the driving unit 300 may provide a base part that serves as a palm for the finger unit 100 that serves as a finger.

According to one embodiment of the present invention, the driving unit 300 may include an actuator for driving the input links 111 of the finger units 100 facing each other on both sides of the driving unit 300. In this case, the driving unit 300 may include the housing 301 for providing a mounting space for the actuator. The housing 301 may be provided in a form of a palm or a wrist. The housing 301 may act as the base part for the finger unit 100.

According to one embodiment of the present invention, the actuator for driving the input links 111 on the both sides may include a worm gear 320 and a worm wheel 330. In this case, the actuator may receive a power from the motor 310.

In this case, the motor 310 may be disposed on an upper side of a space that is set inside the housing 301 (based on the drawings). The motor 310 may be connected to the worm gear 320, and driven to rotate the worm gear 320 when an electric power is applied.

The worm gear 320 may be disposed on a lower side of the space that is set inside the housing 301 (based on the drawings). The worm gear 320 may be connected to the motor 310. The worm gear 320 may be connected to the motor 310 in a vertical direction. The worm gear 320 may be rotated by the motor 310. In this case, since the worm gear 320 may not rotate in a reverse direction, a self-locking transmission mechanism may be implemented through the worm gear 320. As a result, when the electric power is not applied, malfunction of the finger unit 100 may be prevented to ensure safety.

The worm wheel 330 may be disposed on the lower side of the space that is set inside the housing 301. The worm wheel 330 may be engaged with the worm gear 320 so as to be rotated. The worm wheel 330 may be provided in a number corresponding to the finger unit 100, more specifically, the input link 111. Accordingly, one input link 111 may be rotatably and axially coupled to each worm wheel 330.

Hereinafter, a method of operating a robot gripper according to one embodiment of the present invention will be described with reference to FIGS. 12 to 17. In this case, reference numerals for detailed components of the robot gripper will be described with reference to FIGS. 1 to 6.

Referring to FIG. 12, according to one embodiment of the present invention, a method of operating a robot gripper may include a four-bar link device operation step S110 and a fingertip pinch grip step S120.

First, the four-bar link device operation step S110 may be a step of operating a four-bar link device 110 to perform pinch grip of a fingertip 200. In the four-bar link device operation step S110, an electric power may be applied to a driving unit 300, more specifically, a motor 310 so as to drive an actuator including a worm gear 320 and a worm wheel 330. The four-bar link device 110 may be operated by the actuator driven as described above.

Next, the pinch grip step S120 may be a step of allowing the fingertip 200 to pinch-grip an object placed in various environments by the operated four-bar link device 110. The pinch grip step S120 may be divided into an inclined surface ascending/descending operation S121, an outer wall climbing operation S122, an adaptive grasp operation S123, a peg-in-hole operation S124, and a downward pushing operation S125 based on the fingertip 200.

Referring to FIG. 13, when the object is placed on various inclined surfaces, the fingertip 200 may perform the inclined surface ascending/descending operation S121. First, the fingertip 200 located on a left side based on the drawing may move in a direction A toward an inner area, which is formed as the pair of finger units 100 face each other, to perform the pinch grip on the object (1), may ascend an inclined surface located on a lower side of a position in which the object is placed while conforming to environmental constraints when colliding with the inclined surface (2), and may continue to move in the direction A to eventually make contact with the object located on a movement path (3). In addition, the fingertip 200 located on a right side based on the drawing may move in a direction A toward the inner area, which is formed as the pair of finger units 100 face each other, to perform the pinch grip on the object (1), may descend an inclined surface located on an upper side of the position in which the object is placed while conforming to environmental constraints when colliding with the inclined surface (2), and may continue to move in the direction A to eventually make contact with the object located on a movement path (3).

As described above, according to the robot gripper 10 of one embodiment of the present invention, the fingertips 200 on both sides may make contact with both sides of the object through the inclined surface ascending/descending operation S121 so as to pinch-grip the object.

Referring to FIG. 14, when the object is placed on a surface having one side configured as an outer wall, the fingertip 200 may perform the outer wall climbing operation S122. First, the fingertip 200 located on a left side based on the drawing may move in a direction A toward the inner area, which is formed as the pair of finger units 100 face each other, to perform the pinch grip on the object (1), may move while conforming to environmental constraints when colliding with a surface located on a left side of the position in which the object is placed (2), and may eventually make contact with the object located on a movement path (3).

In addition, the fingertip 200 located on a right side based on the drawing may move in a direction A toward the inner area, which is formed as the pair of finger units 100 face each other, to perform the pinch grip on the object (1), may move in a direction C, which is a direction of raising the object, while conforming to environmental constraints to climb an outer wall located on a lower side of the position in which the object is placed when first colliding with the outer wall (2), and may move in the direction A again after the climbing to eventually make contact with the object located on a movement path (3). In this case, when an outer wall is also present on a left side of a surface on which the object is placed, the fingertip 200 located on the left side may be operated in the same manner as the outer wall climbing operation S122 of the fingertip 200 on the right side.

As described above, according to the robot gripper 10 of one embodiment of the present invention, the fingertips 200 on one or both sides may make contact with the both sides of the object through the outer wall climbing operation S122 so as to pinch-grip the object.

Referring to FIG. 15, when the object has an indeterminate shape, the finger unit 100 may perform the adaptive grasp operation S123. The finger units 100 on the both sides may move in a direction A toward the inner area, which is formed as the finger units 100 on the both sides face each other, to grasp the object having the indeterminate shape. In this case, when a first bar of the finger unit 100 first make contact with a surface of the object having the indeterminate shape, the connection link 120 acting as a second bar of the finger unit 100 and the fingertip 200 acting as a third bar of the finger unit 100 may continue to move in the direction A to eventually make contact with the surface of the object placed on a movement path.

As described above, according to the robot gripper 10 of one embodiment of the present invention, the finger units 100 on the both sides may make contact with the object having the indeterminate shape through the adaptive grasp operation S123 so as to grasp the object.

Referring to FIG. 16, when the object inserted in one hole is moved so as to be inserted into a next hole, the fingertip 200 may perform the peg-in-hole operation S124. First, the fingertips 200 on the both sides may move in a direction A in which the fingertips 200 face each other to pinch-grip the object (1). Then, the fingertips 200 on the both sides may move in a direction B, which is a direction of raising the pinch-gripped object, to raise the object so as to pull out the object from the one hole (2).

Next, when the robot gripper 10 is moved so as to be placed on the next hole (3), the fingertip 200 may move in a direction C, which is a direction of pushing the pinch-gripped object downward, to push the object downward so as to insert the object into the next hole (4).

As described above, according to the robot gripper 10 of one embodiment of the present invention, the fingertips 200 on the both sides may move the object inserted in one hole to insert the object into the next hole through the peg-in-hole operation S124.

Referring to FIG. 17, when the object placed on a surface having a specific height is moved onto a surface having a height that is lower than the specific height, the fingertip 200 may perform the downward pushing operation S125. First, the fingertips 200 on the both sides may move in a direction A, which is a direction in which the fingertips 200 face each other, to pinch-grip the object.

Next, when the robot gripper 10 is moved so as to be placed on the surface having a lower position than an initial position (3), the fingertip 200 may move in a direction C, which is a direction of pushing the pinch-gripped object downward, to push the object downward so as to move the object onto the surface having the lower position than the initial position.

As described above, according to the robot gripper 10 of one embodiment of the present invention, the fingertips 200 on the both sides may move the object to the lower position than the initial position through the downward pushing operation S125.

Although the exemplary embodiments of the present invention have been described in detail, the scope of the present invention is not limited to a specific embodiment, and should be interpreted by the appended claims. In addition, it should be understood by those of ordinary skill in the art that various changes and modifications can be made without departing from the scope of the present invention.

The invention claimed is:

1. A adaptive robot gripper for pinch grip comprising:

at least two finger units symmetrically facing each other;

a fingertip provided at a terminal end of the finger unit, and interworking with an operation of the finger unit; and a driving unit connected to the finger unit to operate the finger unit, wherein, when the finger unit is operated, the fingertip pinch-grips an object by moving toward an inner area, which is formed as the at least two finger units face each other, while adapting to a conflict with a constraint of an external environment, and a force applied to the fingertip to enable the pinch grip acts in a direction of raising the object upward while acting toward the inner area, or acts in a direction of lowering the object downward while acting toward the inner area, wherein the finger unit includes a four-bar link device, a vector direction of the force applied to the fingertip is determined according to a length relation of links that constitute sides of the four-bar link device, respectively, the finger unit further includes a connection link, the connection link connects the four-bar link device to the fingertip, the four-bar link device includes:

an input link having one longitudinal end connected to the driving unit;

an output link facing the input link, and having one longitudinal end connected to one longitudinal end of the connection link;

an intermediate link connected between an opposite longitudinal end of the input link and an opposite longitudinal end of the output link; and a frame link connected between the one longitudinal end of the output link and the one longitudinal end of the input link, the finger unit further includes an elastic member, and the elastic member is formed between the output link and the frame link, elastically deformed in a case where an inclination of the output link is changed to increase an angle formed between the output link and the frame link when the driving unit is driven, and configured to recover the inclination of the output link into an initial state through an elastic restoring force so that the angle formed between the output link and the frame link forms an initially set angle again when the driving unit is not driven.

2. The adaptive robot gripper for pinch grip of claim 1, wherein a length relation of the input link, the intermediate link, and the output link is defined according to vector directions of forces generated when an opposite longitudinal end of the connection link makes contact with any three points on a horizontal plane, and, based on the defined length relation, a force acting in the direction of raising the object upward while acting toward the inner area is applied to the fingertip, or a force acting in the direction of lowering the object downward while acting toward the inner area is applied to the fingertip.

3. The adaptive robot gripper for pinch grip of claim 2, wherein, while the output link has a relatively shorter length than the input link and the intermediate link, when the input link has a relatively shorter length than the intermediate link, the force applied to the fingertip acts in the direction of raising the object upward while acting toward the inner area.

4. The adaptive robot gripper for pinch grip of claim 2, wherein, while the output link has a relatively shorter length than the input link and the intermediate link, when the input link has a relatively longer length than the intermediate link, the force applied to the fingertip acts in the direction of lowering the object downward while acting toward the inner area.

5. A adaptive robot gripper for pinch grip comprising:

at least two finger units symmetrically facing each other;

a fingertip provided at a terminal end of the finger unit, and interworking with an operation of the finger unit; and a driving unit connected to the finger unit to operate the finger unit, wherein when the finger unit is operated, the fingertip pinch-grips an object by moving toward an inner area, which is formed as the at least two finger units face each other, while adapting to a conflict with a constraint of an external environment, a force applied to the fingertip to enable the pinch grip acts in a direction of raising the object upward while acting toward the inner area, or acts in a direction of lowering the object downward while acting toward the inner area, the finger unit includes a four-bar link device, and a vector direction of the force applied to the fingertip is determined according to a length relation of links that constitute sides of the four-bar link device, respectively, the finger unit further includes a connection link, the connection link connects the four-bar link device to the fingertip, and the four-bar link device includes:

an input link having one longitudinal end connected to the driving unit;

an output link facing the input link, and having one longitudinal end connected to one longitudinal end of the connection link;

an intermediate link connected between an opposite longitudinal end of the input link and an opposite longitudinal end of the output link; and a frame link connected between the one longitudinal end of the output link and the one longitudinal end of the input link, a length relation of the input link, the intermediate link, and the output link is defined according to vector directions of forces generated when an opposite longitudinal end of the connection link makes contact with any three points on a horizontal plane, based on the defined length relation, a force acting in the direction of raising the object upward while acting toward the inner area is applied to the fingertip, or a force acting in the direction of lowering the object downward while acting toward the inner area is applied to the fingertip, and an angle formed between the connection link and the output link, which is set when the force applied to the fingertip acts in the direction of raising the object upward while acting toward the inner area, is relatively greater than an angle formed between the connection link and the output link, which is set when the force applied to the fingertip acts in the direction of lowering the object downward while acting toward the inner area.

6. The adaptive robot gripper for pinch grip of claim 1, wherein the finger unit further includes a parallelogrammic link device, and the parallelogrammic link device is coupled to the four-bar link device and the connection link to maintain an installation angle of the fingertip, and is dependent on an operation of the four-bar link device.

7. The adaptive robot gripper for pinch grip of claim 1, wherein the at least two finger units are underactuated by the driving unit.

8. The adaptive robot gripper for pinch grip of claim 7, wherein the driving unit includes:

one motor;

one worm gear rotated by the one motor; and worm wheels provided in a number corresponding to the at least two finger units so as to be connected to the at least two finger units, respectively, and engaged with the one worm gear so as to be rotated.

9. The adaptive robot gripper for pinch grip of claim 1, wherein the finger unit further includes a stopper, and the stopper is formed between the output link and the frame link, and configured to restrain a rotation of the output link in a direction of increasing an angle formed between the output link and the frame link.

* * * * *